Jan. 14, 1930.   J. THILL   1,743,291
SNOWPLOW FOR TRACTORS AND MOTOR VEHICLES
Filed Feb. 24, 1928   3 Sheets-Sheet 1
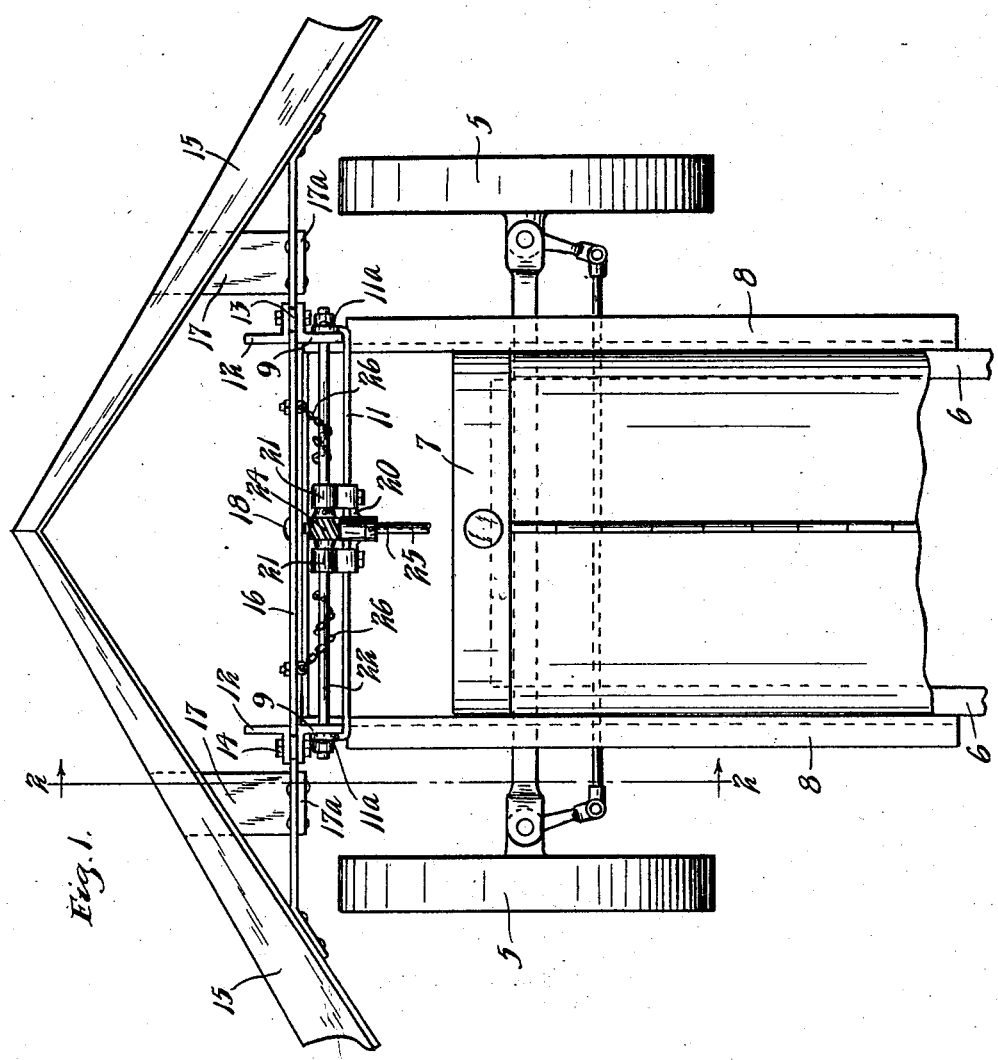
INVENTOR.
JOHN THILL.
BY HIS ATTORNEYS.

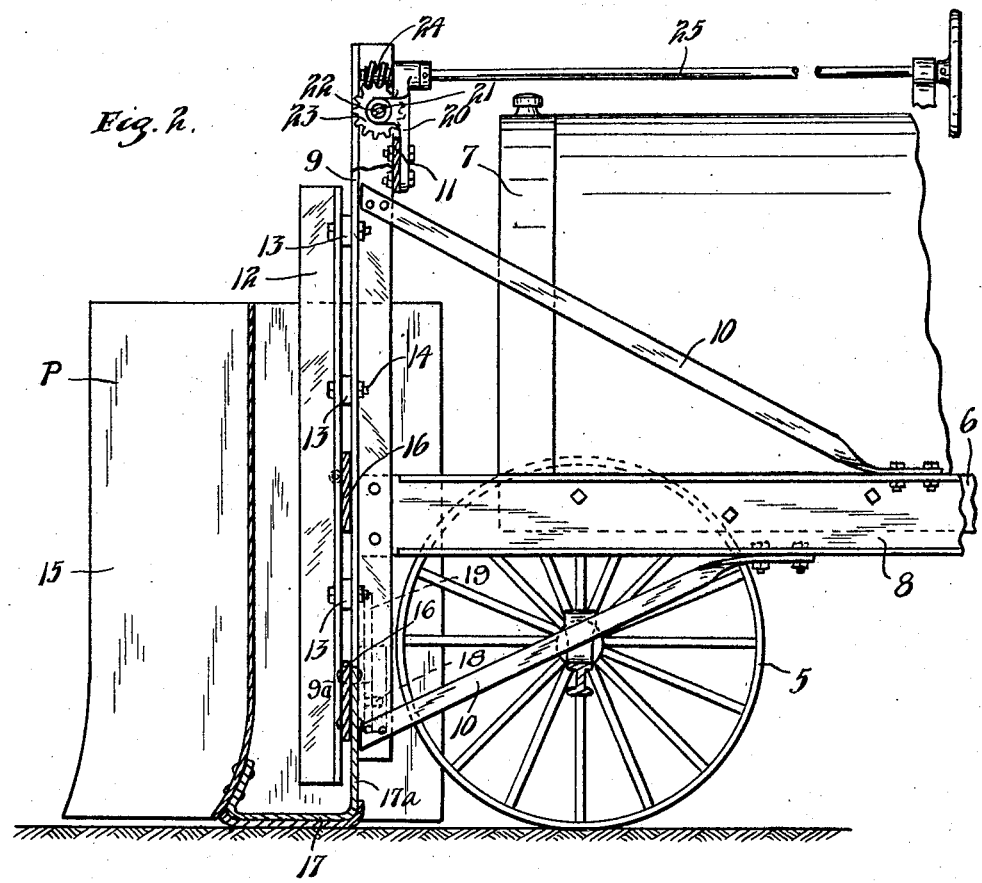

Jan. 14, 1930. J. THILL 1,743,291
SNOWPLOW FOR TRACTORS AND MOTOR VEHICLES
Filed Feb. 24, 1928 3 Sheets-Sheet 3
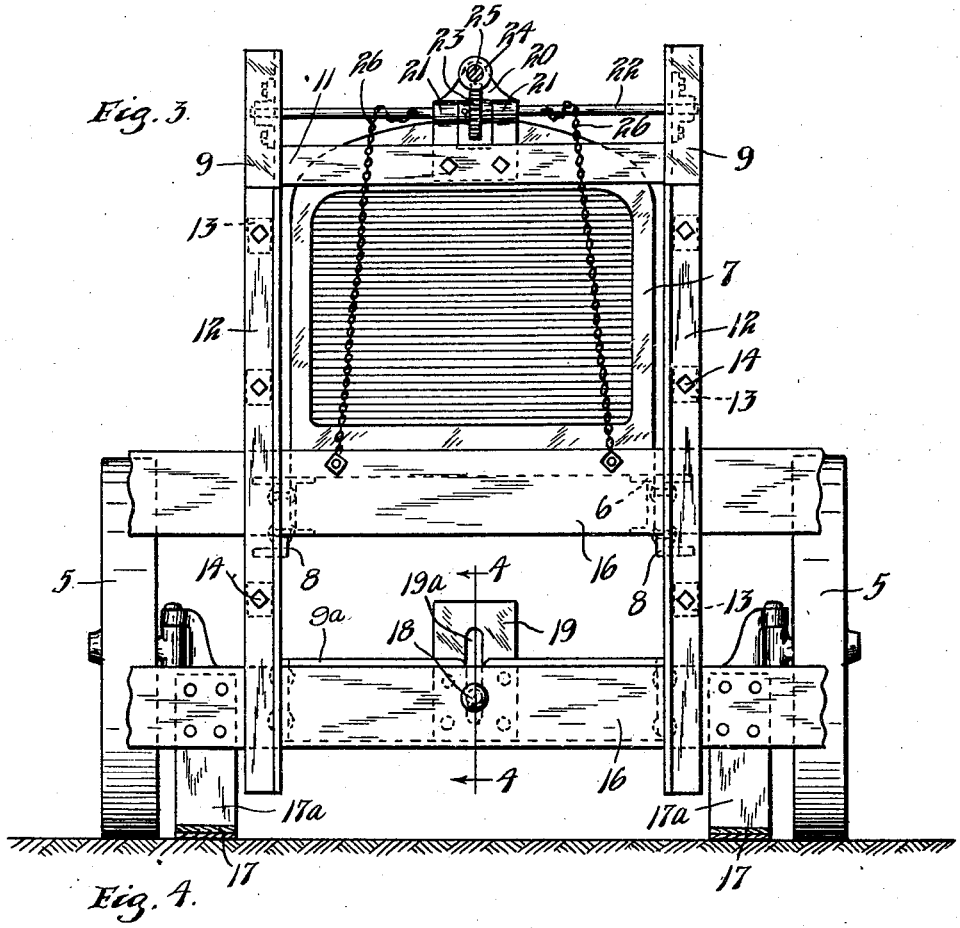
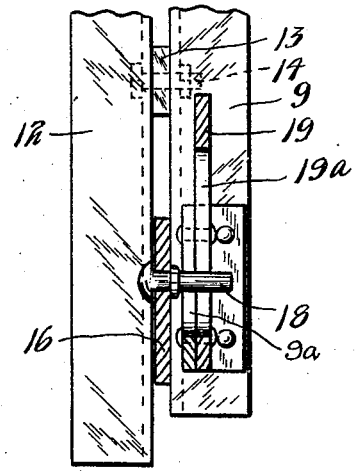
INVENTOR.
JOHN THILL.
BY HIS ATTORNEYS Patented Jan. 14, 1930

1,743,291

UNITED STATES PATENT OFFICE

JOHN THILL, OF ROSE CREEK, MINNESOTA

SNOWPLOW FOR TRACTORS AND MOTOR VEHICLES

Application filed February 24, 1928. Serial No. 256,593.

This invention relates to snow plows and especially to snow plows for tractors and other motor vehicles.

It is an object of my invention to provide a highly efficient snow plow adapted to be readily attached for propulsion to tractors or other motor vehicles but supported when in operation upon the ground rather than upon the tractor or other motor vehicle.

A further object of the invention is to provide a snow plow attachment for tractors or other motor vehicles adapted to oscillate upon a substantially horizontal axis disposed longitudinally of the tractor or motor vehicle in order that the plow may be disposed at all times during the operation of the device in proper position relatively to the ground and in order that the traction of the rear wheels of the tractor or other motor vehicle will be sufficient to properly propel the plow through heavy snow.

Another object is to provide a snow plow for tractors and motor vehicles which will automatically adjust itself to the contour of the road or surface being plowed.

A still further object is to provide a snow plow attachment for tractors or other motor vehicles, wherein the plow is connected with the tractor, or motor vehicle and pushed thereby through the snow, but wherein the plow is supported on the ground and is capable of both sliding movement vertically and oscillation on a horizontal axis to follow the irregularities of the surface to be plowed.

These and other objects and advantages will be apparent from the following description made in connection with the accompanying drawings wherein like reference characters refer to similar parts throughout the several views and in which:—

Fig. 1 is a plan view of the forward portion of a tractor having an embodiment of my invention applied for operation thereon, some parts being broken away;

Fig. 2 is a vertical section taken on the line 2—2 of Fig. 1;

Fig. 3 is a front elevation of a tractor with my invention mounted thereon, the front portion of the plow being broken away; and Fig. 4 is a vertical section on a larger scale taken on the line 4—4 of Fig. 3.

The embodiment of the invention shown in the drawings is applied to a well known type of tractor having the front wheels 5, the chassis frame 6 and radiator 7.

I provide a suitable framework at the forward end of the tractor or the other motor vehicle, to which my plow is connected for propulsion. As shown, this framework comprises a pair of heavy channel irons 8, one secured horizontally at each side of the tractor frame by any suitable means, such as bolts passing through the chassis frame 6 of the tractor. The forward ends of the channel irons 8 project slightly beyond the radiator 7 of the tractor. Upright members, such as the angle bars 9 are rigidly secured to the forward ends of the channel bars 8 extending at each side of the tractor and in parallel relation. These angle bars may be braced above and below the horizontal channel irons 8 by means of diagonal braces 10 secured at their rear ends to flanges of the channel members 8. The upper ends of upright angle irons 9 are connected by means of a cross bar 11 having turned ends, each provided with suitable bearings 11ª, said bearings being oppositely alined and having the ends disposed against parallel flanges of the two upright angle irons.

A pair of vertical guide members 12 which may be of angle bar structure are secured in spaced relation to the forward sides of the upright angle bars 9 spaced therefrom by means of a plurality of transverse spacing bars 13 secured at intervals across angle bars 9. As shown, guide bars 12 and spacing bars 13 are secured to the upright angle bars 9 by means of nutted bolts 14.

As illustrated, a V-shaped plow P is provided having the oppositely inclined blades 15 reinforced by a plurality (shown as two) of transverse beams 16, said beams or bars having offset or inclined extremities and said extremities being riveted or otherwise secured to the rear portions of the plow blades. The beams 16 are vertically alined and are disposed between angle bars 9 and the guide members 12, obviously, connecting the plow with the framework at the forward end of the tractor in such a manner as to permit vertical sliding movement of said plow relatively to the frame. The plow is supported upon a pair of suitable shoes 17, as shown, one disposed adjacent each side of the tractor, said shoes having vertical shanks 17ª which are rigidly secured to the lower beam 16.

A horizontal plate supporting bar 9ª is secured across the lower ends of angle bars 9 disposed edgewise and with one of its surfaces in close relation to the lower plow beam 16. Said lower plow beam carries a horizontal and inwardly projecting stud or pivot member 18, which works in a vertical slot extending through plate carrying bar 9ª and through a slot 19ª in a confining plate 19 secured to the central portion of plate bar 9ª. Slot 19ª is of slightly greater width than the pivot stud 18 and is preferably of sufficient length to permit the plow to be lifted six or seven inches off the ground.

I prefer to provide suitable means for elevating my plow from the ground when the same is not in use or when in plowing it is desired to back the tractor away from a drift. As illustrated, this means comprises a suitable bracket 20 which may be rigidly attached to the cross bar 11, said bracket carrying horizontally alined bearings 21 which are also alined with the bearings 11ª provided in the turned extremities of cross bar 11. A winding shaft 22 is journaled in bearings 21 and in the bearings 11ª and is prevented from longitudinal displacement by suitable means such as the set collars at the extremities thereof. Shaft 22 has fixed to the medial portion thereof between the bearings 21 a worm gear 23 which is engaged by a suitable worm 24, the shaft of which is journaled in a bearing integrally formed with or fixed to bracket 20 and having its axis disposed at right angles to the axes of bearings 21, said worm is fixed to the end of an elongated shaft 25 which may extend rearwardly above the hood of the tractor and into the cab or platform of the tractor for convenient manipulation by the driver. A pair of flexible members, such as the chains 26 are connected to winding shaft 20 and extend downwardly having their lower ends attached to the upper plow beam 16, the points of connection with said plow preferably being spaced wide apart and adjacent the angle irons 9.

Operation

The operation of my device may be briefly described as follows:—

When the plow is put in operation the weight thereof is supported upon shoes 17 which engage the road or ground and the tractor is driven, pushing with it the plow and, of course, distributing the snow or other material at the sides of the tractor. The entire weight of the plow is supported from the ground and will not tend to sag the front end of the tractor or to lift the traction wheels off of the ground. Consequently, adequate traction for impelling the plow is obtained. Assuming that the plow is pushed to a higher level of ground than that upon which the wheels of the tractor are supported it will be raised by the ground, bars 16 bearing against the angle irons 9 and sliding vertically to suit conditions. Stud 18 will also slide vertically in slot 19ª. Also, if the contour of the road or surface ahead of the tractor slopes at a different angle than the surface upon which the tractor is supported plow P may oscillate on stud 18 causing the lower edges thereof to be maintained at the proper distance with respect to the ground and without causing one of the traction wheels to be raised.

It will be seen that adequate bearing surface or thrust surface is provided by the efficient frame, including the upright angle bars 9 at the forward end of the tractor and that said upright bars are rigidly held with respect to the tractor frame by means of the two channel members 8 and the diagonal braces 10.

It is sometimes desirable in plowing through heavy drifts to back the tractor or vehicle carrying the plow to obtain a fresh start. To do this plow P is preferably elevated by turning shaft 24, chains 26 being wound upon the winding shaft 22. When the plow is elevated and the tractor backed the snow behind the plow will not be collected in the backward movement. It is also obvious that the plow may be elevated when it is desired to move the tractor over the road without plowing.

Plows heretofore used in connection with tractors or motor vehicles have generally been unsuccessful for heavy duty for the reason that the plow is usually rigidly connected with the forward end of the tractor or motor vehicle and the weight thereof as well as the resistance of the snow would tend to lift the traction wheels from the ground. In addition to this disadvantage such plows have not been constructed to be automatically adjustable for the contour of the surface to be plowed.

From the foregoing description it will be obvious that I have provided a simple but highly efficient plow structure for tractors and motor vehicles which may be applied to practically all types of tractors and heavy motor vehicles and which will obviate the objections to most devices of this class heretofore used. It will be apparent that with my device a tractor may use its full power to propel the plow through the snow and the plow itself will be adjustable vertically and swingably with the contour of a surface to be plowed.

It will, of course, be understood that various changes may be made in the form, details, arrangement and proportions of the parts without departing from the scope of the invention.

What is claimed is:—

1. In snow plow structure for motor driven vehicles, a substantially V-shaped snow plow having a push bar at the rear thereof, a frame rigidly connected to the forward end of a motor vehicle and having a forward thrust surface, means for supporting said plow from the ground, said frame carrying vertical guides in which said push bar is mounted for slidable movement, and a connection between said plow and said frame to permit oscillation of said plow relatively thereto on a substantially horizontal axis extending longitudinally of said vehicle.

2. In snow plow structure for motor driven vehicles, a substantially V-shaped plow having a push bar at the rear end thereof, shoes for supporting said plow from the ground, a frame rigidly secured to the forward end of a motor vehicle, said frame having a vertical thrust surface adapted to engage said push bar, and a slot and pin connection between said plow and said frame adapted to permit vertical sliding movement of said plow relatively to said frame, and also oscillation of said plow on substantially a horizontal axis extending longitudinally of said vehicle.

3. In snow plow structure for motor driven vehicles, a plow having a pushing surface at the rear thereof, a frame rigidly secured to the forward end of a motor vehicle and having a forward thrust surface adapted to abut the pushing surface of said plow, said plow and said frame having a central slot and pin connection, the pin extending horizontally and longitudinally of said vehicle to permit said plow to slide vertically or to oscillate on said pin.

In testimony whereof I affix my signature.

JOHN THILL.